United States Patent
Dejneka et al.

(10) Patent No.: US 11,767,253 B2
(45) Date of Patent: *Sep. 26, 2023

(54) ZIRCON COMPATIBLE, ION EXCHANGEABLE GLASS WITH HIGH DAMAGE RESISTANCE

(71) Applicant: CORNING INCORPORATED, Corning, NY (US)

(72) Inventors: Matthew John Dejneka, Corning, NY (US); Adam James Ellison, Corning, NY (US); John Christopher Mauro, Boalsburg, PA (US)

(73) Assignee: CORNING INCORPORATED, Corning, NY (US)

(*) Notice: Subject to any disclaimer, the term of this patent is extended or adjusted under 35 U.S.C. 154(b) by 387 days.

This patent is subject to a terminal disclaimer.

(21) Appl. No.: 16/799,451

(22) Filed: Feb. 24, 2020

(65) Prior Publication Data

US 2020/0189963 A1    Jun. 18, 2020

Related U.S. Application Data

(63) Continuation of application No. 15/795,844, filed on Oct. 27, 2017, now Pat. No. 10,570,053, which is a continuation of application No. 14/591,361, filed on Jan. 7, 2015, now Pat. No. 9,822,032, which is a continuation of application No. 13/903,433, filed on May 28, 2013, now Pat. No. 8,951,927.

(60) Provisional application No. 61/653,489, filed on May 31, 2012, provisional application No. 61/748,981, filed on Jan. 4, 2013.

(51) Int. Cl.
| | |
|---|---|
| C03C 3/093 | (2006.01) |
| C03C 21/00 | (2006.01) |
| C03C 3/083 | (2006.01) |
| C03C 3/085 | (2006.01) |
| C03C 3/087 | (2006.01) |
| C03C 3/091 | (2006.01) |
| C03C 4/18 | (2006.01) |

(52) U.S. Cl.
CPC .............. *C03C 3/093* (2013.01); *C03C 3/083* (2013.01); *C03C 3/085* (2013.01); *C03C 3/087* (2013.01); *C03C 3/091* (2013.01); *C03C 4/18* (2013.01); *C03C 21/002* (2013.01); *C03C 2204/00* (2013.01); *Y10T 428/315* (2015.01)

(58) Field of Classification Search
CPC ......... C03C 3/083; C03C 3/085; C03C 3/087; C03C 3/091; C03C 3/093; C03C 4/18; C03C 21/002; C03C 2204/00; Y10T 428/315

See application file for complete search history.

(56) References Cited

U.S. PATENT DOCUMENTS

| | | | |
|---|---|---|---|
| 2,434,139 | A | 1/1948 | Armistead |
| 4,192,688 | A | 3/1980 | Babcock |
| 5,674,790 | A | 10/1997 | Araujo |
| 6,818,576 | B2 | 11/2004 | Ikenishi et al. |
| 7,396,788 | B2 | 7/2008 | Kawai et al. |
| 7,666,511 | B2 | 2/2010 | Ellison et al. |
| 8,076,014 | B2 | 12/2011 | Tachiwana et al. |
| 8,158,543 | B2 | 2/2012 | Dejneka et al. |
| 8,187,987 | B2 | 5/2012 | Amin et al. |
| 8,222,170 | B2 | 7/2012 | Ikenishi et al. |
| 8,586,492 | B2 | 11/2013 | Barefoot et al. |
| 8,802,581 | B2 | 8/2014 | Dejneka et al. |
| 8,889,575 | B2 | 11/2014 | Boek et al. |
| 8,946,103 | B2 | 2/2015 | Dejneka et al. |
| 8,951,927 | B2 | 2/2015 | Dejneka et al. |
| 9,434,644 | B2 | 9/2016 | Koyama et al. |
| 9,822,032 | B2 * | 11/2017 | Dejneka ................. C03C 3/087 |
| 10,570,053 | B2 * | 2/2020 | Dejneka ................. C03C 3/093 |
| 2003/0109370 | A1 | 6/2003 | Ikenishi et al. |
| 2003/0129329 | A1 | 7/2003 | Grossman |
| 2005/0209083 | A1 | 9/2005 | Takagi et al. |
| 2008/0020919 | A1 | 1/2008 | Murata |
| 2009/0142568 | A1 | 6/2009 | Dejneka et al. |
| 2009/0197048 | A1 | 8/2009 | Amin et al. |
| 2009/0197088 | A1 | 8/2009 | Murata |
| 2009/0202808 | A1 | 8/2009 | Glaesemann et al. |
| 2010/0035038 | A1 | 2/2010 | Barefoot et al. |
| 2010/0035745 | A1 | 2/2010 | Murata |
| 2010/0047521 | A1 | 2/2010 | Amin et al. |

(Continued)

FOREIGN PATENT DOCUMENTS

| | | |
|---|---|---|
| CN | 102351420 A | 2/2012 |
| DE | 1696063 A1 | 8/1971 |

(Continued)

OTHER PUBLICATIONS

European Patent Application No. 21168413.9, Extended European Search Report, dated Nov. 9, 2021; 7 pages; European Patent Office.
Korean Patent Application No. 10-2014-7037052, Notice of Allowance dated Apr. 23, 2021,4 pages (2 pages of English Translation and 2 pages of Original Document), Korean Patent Office.
Japanese Patent Application No. 2019-097818, Decision to Grant dated May 26, 2021, 5 pages (2 pages of English Translation and 2 pages of Original Document), Japanese Patent Office.
English Translation of JP2019097818 Office Action dated Jul. 22, 2020; 3 Pages; Japanese Patent Office.
Taiwanese Search Report; 109114430; dated Oct. 23, 2020; 1 page; (English Translation Only) Taiwanese Patent Office.

(Continued)

*Primary Examiner* — Elizabeth A. Bolden
(74) *Attorney, Agent, or Firm* — Travis B. Gasa (57) ABSTRACT

An ion exchangeable glass having a high degree of resistance to damage caused by abrasion, scratching, indentation, and the like. The glass comprises alumina, $B_2O_3$, and alkali metal oxides, and contains boron cations having three-fold coordination. The glass, when ion exchanged, has a Vickers crack initiation threshold of at least 10 kilogram force (kgf).

12 Claims, 1 Drawing Sheet

(56) References Cited

U.S. PATENT DOCUMENTS

| | | |
|---|---|---|
| 2010/0291353 A1 | 11/2010 | Dejneka et al. |
| 2011/0014475 A1 | 1/2011 | Murata |
| 2011/0045961 A1 | 2/2011 | Dejneka et al. |
| 2011/0201490 A1 | 8/2011 | Barefoot et al. |
| 2011/0294648 A1 | 12/2011 | Chapman et al. |
| 2011/0294649 A1 | 12/2011 | Gomez et al. |
| 2012/0135852 A1 | 5/2012 | Ellison et al. |
| 2012/0202040 A1 | 8/2012 | Barefoot et al. |
| 2012/0251743 A1 | 10/2012 | Amin et al. |
| 2012/0297829 A1 | 11/2012 | Endo et al. |
| 2013/0004758 A1 | 1/2013 | Dejneka et al. |
| 2014/0106172 A1 | 4/2014 | Dejneka et al. |
| 2022/0009819 A1* | 1/2022 | Dejneka .................. C03C 3/087 |

FOREIGN PATENT DOCUMENTS

| | | |
|---|---|---|
| GB | 1246384 A | 9/1971 |
| JP | 01-226749 A | 9/1989 |
| JP | 1226789 A | 9/1989 |
| JP | 11310430 A | 11/1999 |
| JP | 2004-161597 A | 6/2004 |
| JP | 2010-168233 A | 8/2010 |
| JP | 2011213576 A | 10/2011 |
| TW | 201602040 A | 1/2016 |
| WO | 2004/031088 A1 | 4/2004 |
| WO | 2008108332 A1 | 9/2008 |
| WO | 2011/022639 A2 | 2/2011 |
| WO | 2011/022661 A2 | 2/2011 |
| WO | 2011/069338 A1 | 6/2011 |
| WO | 2011103798 A1 | 9/2011 |
| WO | 2011114821 A1 | 9/2011 |

OTHER PUBLICATIONS

Al-Harbi and Khan, "Utilization of local raw materials for the production of commercial glasses" Trends in Applied Sciences Research, 2009, 4 (4), p. 176-187.

Angeli et al., "Boron Speciation in Soda-Lime Borosilicate Glasses Containing Zirconium", The American Ceramic Society, vol. 93 Issue 9, pp. 2693-2704, Sep. 2010.

Angelia et al., "Effect of Temperature and Thermal History on Borosilicate Glass Structure", Phys. Rev. B 85, 054110, Feb. 14, 2012.

Du et al., "Pressure-induced structural changes in a borosilicate glass-forming liquid: boron coordination, non-bridging oxygens, and network ordering", Journal of Non-Crystalline Solids, vol. 337, pp. 196-200, Feb. 5, 2004.

Galant and Appen, "Aluminum-borate anomaly of the optical properties of silicate glasses" Zh. Prikl. Khim. 1958. 31(11) pp. 1727-1729.

Geisinger et. al "Thermochemistry and structure of glasses along the join NaAlSi3O8—NaBSi3O8", Geochimica et Cosmochimica Acta 52[10] p. 2405-2414 (1988).

International Search Report and Written Opinion of the International Searching Authority; PCT/US2013/042840; dated Oct. 17, 2013, 11 Pages.

Roy and Navrotsky, "Thermochemistry of Charge-Coupled Substitutions in Silicate Glasses: The Systems MI/nn +AlO2—SiO2 (M = Li, Na, K, Rb, Cs, Mg, Ca, Sr, Ba,Pb)", Journal of the Americal Ceramic Society, 67[9]: pp. 606-610 (1984).

Smedskjaer et al. "Sodium diffusion in boroaluminosilicate glasses", Journal of Non-Crystalline Solids, 2011, 357 (22-23), p. 3744-3750.

Stebbins et al., "Non-bridging oxygens in borate glasses; characterization by 11 Band 170 MAS and 3QMAS NMR", Solid State Nuclear Magnetic Resonact, vol. 16, Issues 1-2, pp. 9-19, May 2000.

U.S. Office action pertaining to U.S. Appl. No. 13/903,433 dated May 20, 2014. 15 pages.

Wan et al., "The Corrdination State of Band A 1 of Borosilicate Glass by IR Spectra", Journal of Wuhan University of Technology, Mater. vol. 23, No. 3, pp. 419-421, Jun. 2008.

Wu et al. "Sodium tracer diffusion in sodium boroaluminoilicate glasses", J.Non-Cryst.Solids, 2012, 358 (12-13) p. 1430-1437.

Zheng et al. "Composition-structure-property relationships in boroaluminosilicate glasses", Journal of Non-Crystalline Solids, 2012, 358 (6-7) p. 993-1002.

European Patent Application No. 13727766.1; Office Action dated Sep. 30, 2019; European Patent Office; 6 Pgs.

Japanese Patent Application No. 2022-007765, Office Action dated Feb. 27, 2023, 4 pages (English Translation only), Japanese Patent Office.

Japanese Patent Application No. 2022-007769, Office Action dated Feb. 28, 2023, 5 pages (English Translation only), Japanese Patent Office.

Taiwanese Patent Application No. 110138662, Office Action, dated Feb. 17, 2022, 1 page; Taiwanese Patent Office.

* cited by examiner

ZIRCON COMPATIBLE, ION EXCHANGEABLE GLASS WITH HIGH DAMAGE RESISTANCE

This application is a continuation of U.S. patent application Ser. No. 15/795,844 filed on Oct. 27, 2017, which is a continuation of U.S. patent application Ser. No. 14/591,361, filed Jan. 7, 2015, which is a continuation of U.S. patent application Ser. No. 13/903,433, filed May 28, 2013, now U.S. Pat. No. 8,951,927, which claims the benefit of priority under 35 U.S.C. § 119 of U.S. Provisional Application Ser. No. 61/653,489, filed on May 31, 2012, and U.S. Provisional Application Ser. No. 61/748,981, filed on Jan. 4, 2013, the contents of which are relied upon and incorporated herein by reference in their entirety.

BACKGROUND

The disclosure relates to glasses that are capable of chemical strengthening by ion exchange and have intrinsic or "native" damage resistance. More particularly, the disclosure relates to such glasses that are strengthened by ion exchange and possess resistance to damage by abrasion, scratching, indentation, and other forms of sharp contact.

The ion exchange process provides a substantial improvement of glasses that are capable of being strengthened by this process to resist damage by sharp impact or indentation. To date, glasses containing network modifiers such as alkali and alkaline earth cations have been used. These cations form non-bridging oxygens (oxygens bonded to only one silicon atom), which reduce the resistance of the ion exchanged glass to damage introduced by abrasion, scratching, or the like.

SUMMARY

The present disclosure provides an ion exchangeable glass having a high degree of resistance to damage caused by abrasion, scratching, indentation, and the like. The glass comprises alumina, $B_2O_3$, and alkali metal oxides, and contains boron cations having three-fold coordination. The glass, when ion exchanged, has a Vickers crack initiation threshold of at least 10 kilogram force (kgf).

Accordingly, one aspect of the disclosure is to provide an ion exchangeable glass comprising at least about 50 mol % $SiO_2$; at least about 10 mol % $R_2O$, wherein $R_2O$ comprises $Na_2O$; $Al_2O_3$, wherein $Al_2O_3$(mol %)<$R_2O$(mol %); and $B_2O_3$, and wherein $B_2O_3$(mol %)−($R_2O$(mol %)−$Al_2O_3$(mol %))≥3 mol %.

A second aspect of the disclosure is to provide a glass comprising at least about 50 mol % $SiO_2$; at least about 10 mol % $R_2O$, wherein $R_2O$ comprises $Na_2O$; $Al_2O_3$; and $B_2O_3$, wherein $B_2O_3$(mol %)−($R_2O$(mol %)−$Al_2O_3$(mol %))≥3 mol %, and wherein the glass has a zircon breakdown temperature that is equal to the temperature at which the glass has a viscosity in a range from about 25 kPoise to about 40 kPoise.

A third aspect of the disclosure is to provide an ion exchanged glass having a Vickers crack initiation threshold of at least about 10 kgf. The glass comprises at least about 50 mol % $SiO_2$; at least about 10 mol % $R_2O$, wherein $R_2O$ comprises $Na_2O$; $Al_2O_3$, wherein $Al_2O_3$(mol %)<$R_2O$(mol %); and $B_2O_3$, wherein $B_2O_3$(mol %)−($R_2O$(mol %)−$Al_2O_3$ (mol %))≥3 mol %.

A fourth aspect is to provide a glass comprising: at least about 50 mol % $SiO_2$; at least about 10 mol % $R_2O$, wherein $R_2O$ comprises $Na_2O$; $Al_2O_3$; and at least 2.7 mol % $B_2O_3$ containing coordinated boron cations, wherein $B_2O_3$−($R_2O$−$Al_2O_3$)≥3 mol %.

These and other aspects, advantages, and salient features will become apparent from the following detailed description, the accompanying drawings, and the appended claims.

DETAILED DESCRIPTION

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass" and "glasses" includes both glasses and glass ceramics. The terms "glass article" and "glass articles" are used in their broadest sense to include any object made wholly or partly of glass and/or glass ceramic.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Unless otherwise specified, all compositions and concentrations described herein are expressed in mole percent (mol %). It is understood that the compositional ranges described and claimed herein represent the bulk composition of the glass as determined by those means skilled in the art, and are applicable to both the unstrengthened and strengthened glasses described herein.

Figure 1:
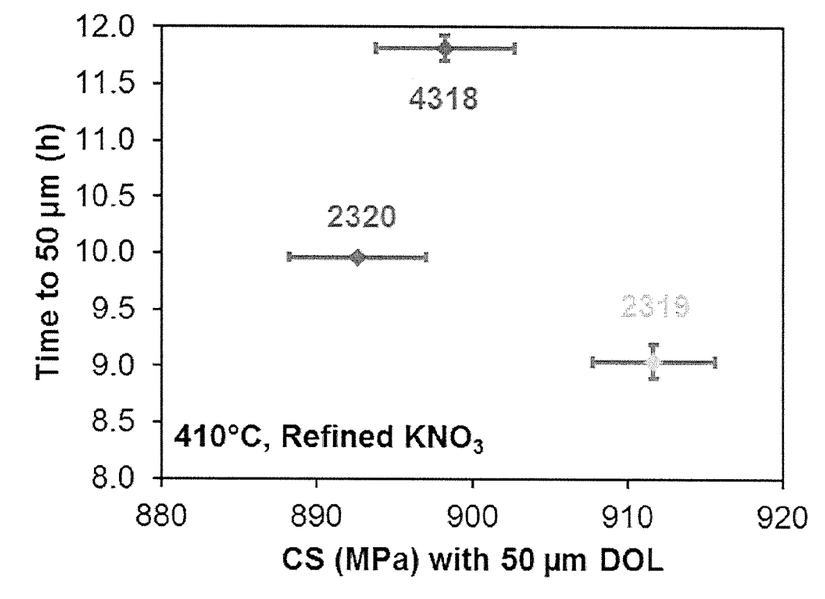
FIG. 1 is a plot of nuclear magnetic resonance (NMR) spectra for samples of the glasses described herein.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Accordingly, a glass having intrinsic damage resistance is provided. In one aspect, the glass, which may be strengthened so as to be resistant to damage via sharp impact, comprises at least about 50 mol % $SiO_2$; at least about 10 mol % of at least one alkali metal oxide $R_2O$, wherein $R_2O$ includes $Na_2O$ and, optionally, other alkali metal oxides (e.g., $Li_2O$, $K_2O$, $Cs_2O$, $Rb_2O$); alumina ($Al_2O_3$), wherein the amount of $Al_2O_3$, expressed in mol %, is less than the total amount of the alkali metal oxides present in the glass (i.e., $Al_2O_3$(mol %)<$R_2O$(mol %)); and boron oxide ($B_2O_3$), wherein $B_2O_3$(mol %)−($R_2O$(mol %)−$Al_2O_3$(mol %))≥3 mol %.

In another aspect, the glass comprises at least about 50 mol % $SiO_2$; $Al_2O_3$; $B_2O_3$; and at least about 10 mol % $R_2O$, wherein $R_2O$ comprises $Na_2O$; wherein $B_2O_3$(mol %)−($R_2O$(mol %)−$Al_2O_3$(mol %))≥3 mol %, and wherein the glass has a zircon breakdown temperature (i.e., the temperature at which zircon breaks down to form zirconia and silica) equal to the temperature at which the viscosity of the glass is in a range from about 25 kPoise to about 40 kPoise.

In some aspects, the glasses described herein are ion exchangeable; i.e., cations—typically monovalent alkali metal cations—which are present in these glasses are replaced with larger cations—typically monovalent alkali metal cations, although other cations such as $Ag^+$ or $Tl^+$—having the same valence or oxidation state. The replacement of smaller cations with larger cations creates a surface layer that is under compression, or compressive stress CS. This layer extends from the surface into the interior or bulk of the glass to a depth of layer DOL. The compressive stress in the surface layers of the glass are balanced by a tensile stress, or central tension CT, in the interior or inner region of the glass. Compressive stress and depth of layer are measured using those means known in the art. Such means include, but are not limited to measurement of surface stress (FSM) using commercially available instruments such as the FSM-6000, manufactured by Luceo Co., Ltd. (Tokyo, Japan), or the like. Methods of measuring compressive stress and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the stress-induced birefringence of the glass. SOC in turn is measured by those methods that are known in the art, such as fiber and four point bend method, both of which are described in ASTM standard C770-98 (2008), entitled "Standard Test Method for Measurement of Glass Stress-Optical Coefficient," the contents of which are incorporated herein by reference in their entirety, and a bulk cylinder method.

In other aspects, the glasses described herein are ion exchanged and have at least one surface having a layer that is under compression to a depth of layer and an inner region that is under a tensile stress, as described hereinabove. In one aspect, the ion exchanged glass comprises at least about 50 mol % $SiO_2$; at least about 10 mol % $R_2O$, wherein $R_2O$ comprises $Na_2O$; $Al_2O_3$; and $B_2O_3$, and wherein $B_2O_3$−($R_2O$−$Al_2O_3$)≥3 mol %. The ion exchanged glass has a Vickers crack initiation threshold of at least about 10 kilogram force (kgf).

When present in boroaluminosilicate glasses, alkali metals act as charge-balancing cations for tetrahedrally coordinated aluminum and boron. Species similar to $RAlO_2$ or $RBO_2$, where R is an alkali metal and aluminum are $Al^{3+}$ and $B^{3+}$, for example, are four-fold coordinated by oxygen. The four oxygen atoms surrounding aluminum or boron are presumed to bond to silicon atoms. Each oxygen therefore obtains one electron from the silicon atoms and, in effect, ¾ of an electron from the tetrahedrally coordinated $Al^{3+}$ or $B^{3+}$. An alkali metal donates an electron to this configuration, thus allowing all four oxygens in the tetrahedron to obtain a full electron shell. The large alkaline earth elements Ca, Sr, and Ba are known to fill this role for aluminum. Thus, in a boroaluminosilicate glass in which $R_2O$(mol %)+CaO (mol %)+SrO+BaO(mol %)−$Al_2O_3$(mol %)−$B_2O_3$(mol %)=0(mol %) or, alternatively, ($Al_2O_3$(mol %)+$B_2O_3$(mol %))/($R_2O$(mol %)+CaO(mol %)+SrO(mol %)+BaO(mol %))=1, there are exactly as many electrons donated from alkalis and alkaline earths as there are tetrahedrally coordinated aluminum and boron atoms in need of charge balance. When $R_2O$(mol %)+CaO(mol %)+SrO(mol %)+BaO(mol %)−$Al_2O_3$(mol %)−$B_2O_3$(mol %)<0(mol %), there are more aluminum and boron atoms in need of charge balance than electrons from charge-balancing alkali or alkaline earth cations. Such glasses generally have high intrinsic or "native" damage resistance, which is considerably enhanced after ion exchange.

In these glasses, aluminum is nearly always four-fold coordinated by oxygen if enough charge-balancing cations are available. Low-valence cations perform better in a charge-balancing role than small, higher valence cations. This has been attributed to the extent to which the charge-balancing cation competes with aluminum for electron density. Large, low-valence cations are ineffective in this competition and thus leave electron density largely within the $AlO_4$ tetrahedron. Boron is mostly four-fold coordinated in fully annealed alkali borosilicate glasses in which the amount of alkali oxide present in the glass is less than or equal to than the concentration $Al_2O_3$, as the alkali modifiers are consumed or taken up in bonds with aluminum. In fully annealed alkali borosilicate glasses in which the amount of alkali oxide present in the glass is greater than the combined concentration of $B_2O_3$ and $Al_2O_3$, boron is mostly four-fold coordinated and the excess alkali modifiers are taken up in non-bridging oxygen (NBO) bonds. In fully annealed boroaluminosilicate glasses in which $B_2O_3$≥alkali modifiers>$Al_2O_3$, however, boron assumes a mix of three and four-fold coordination, even in charge-balanced compositions. When fast-cooled from above the anneal or strain point of the glass, the formation of three-fold coordinated boron is entropically preferred. Thus, the proportion of three-fold coordinated boron may be enhanced through forming processes such as down-draw (e.g., slot- or fusion-draw) processes, or by heating the glass to a temperature above its anneal or strain point, followed by fast-cooling (e.g., at rates of at least about 4° C./s). In some embodiments, the glass is fast-cooled from a temperature that is above the anneal or strain point of the glass. To a reasonable approximation, charge-balancing cations first stabilize aluminum in four-fold coordination, and the remaining cations stabilize some fraction of boron in four-fold coordination, where the fraction may be as high as 1. The glasses described herein comprise at least 2.7 mol % and, in some embodiments, from about 2.7 mol % to about 4.5 mol % $B_2O_3$, in which the boron cations are predominantly three-fold coordinated. In some embodiments, at least about 50% of the boron cations comprising the glasses described herein are three-fold coordinated. In other embodiments, at least about 80% of the boron in these glasses is three-fold coordinated and, in still other embodiments, at least 90% of the boron cations in these glasses are three-fold coordinated. The proportion of three fold boron can be determined using $^{11}$B nuclear magnetic resonance (NMR). FIG. 1 shows NMR spectra for samples of the glasses described herein having the composition 67.45 mol % $SiO_2$, 12.69 mol % $Al_2O_3$, 3.67 mol % $B_2O_3$, 13.67 mol % $Na_2O$, 2.36 mol % MgO, and 0.09 mol % $SnO_2$. The amount of four-fold coordinated boron ($N_4$ in FIG. 1) ranges from 8.9% to 9.5%. Thus, about 90% of the boron present in each of the samples shown in FIG. 1 is three-fold coordinated.

When $R_2O$(mol %)+MO(mol %)<$Al_2O_3$(mol %), where MO represents divalent metal oxides (e.g., MgO, ZnO, CaO, BaO, SrO, etc.), there are not enough monovalent or divalent cations to stabilize aluminum in four-fold coordination, and boron is therefore almost entirely in three-fold coordination in these glasses. In some embodiments, the glasses described herein comprise about 3 mol % to about 4.5 mol % of $B_2O_3$ which contains boron cations that are surrounded by three anions; i.e., the boron cations are three-fold coordinated and, in some embodiments, $B_2O_3$(mol %)−($R_2O$(mol %)−$Al_2O_3$(mol %))≥4.5 mol %. Three-fold coordinated boron is desirable because it densifies more readily when compressed, thus providing intrinsic or native damage resistance to the glass. Glasses with compositions in which $R_2O$(mol %)+MO(mol %)−$Al_2O_3$(mol %)<0(mol %), however, generally have very high melting temperatures unless they also have very high $B_2O_3$ contents, e.g., greater than about 10 mol %. Such high amounts of $B_2O_3$ have a deleterious effect on both the surface compressive stress and rate of ion exchange, as evidenced by low depths of layer obtained in an ion exchange of fixed duration/time period. Since high CS (e.g., greater than about 650 MPa) and significant depth of layer (DOL) (e.g., greater than 30 μm) are also required to obtain good damage resistance, the additional benefits of high intrinsic damage resistance may be offset by poor ion exchange characteristics. In order to achieve optimal balance of attributes after ion exchange, it is therefore desirable to keep boron concentrations sufficiently low. Accordingly, in some embodiments, the glasses described herein comprise less than 10 mol % $B_2O_3$. Such glasses are very difficult to melt to a level of quality (e.g., defect concentration) acceptable for mass manufacturing. Depending on the application for the glass article, a marginally acceptable defect level in a continuous process is about 1 inclusion (e.g., gas bubbles, particles, or "seeds") that are greater than about 50 μm in size (e.g., diameter, for approximately spherical particles, or major axis for elongated particles) per pound (lb) of glass.

In some embodiments, the glasses described herein comprise at least about 50 mol % $SiO_2$, from about 9 mol % to about 22 mol % $Al_2O_3$; from about 3 mol % to about 10 mol % $B_2O_3$; from about 10 mol % to about 20 mol % $Na_2O$; from 0 mol % to about 5 mol % $K_2O$; at least about 0.1 mol % MgO and/or ZnO, wherein 0 mol %≤MgO(mol %)+ZnO(mol %)≤6 mol %; and, optionally, at least one of CaO, BaO, and SrO, wherein 0 mol %≤CaO(mol %)+SrO(mol %)+BaO(mol %)≤2 mol %. In some embodiments, the glasses described herein comprise from about 66 mol % to about 74 mol % $SiO_2$.

In some embodiments, the glasses described herein comprise at least about 0.1 mol % of at least one of MgO and ZnO. In certain embodiments, the glass may comprise up to about 6 mol % MgO and/or ZnO. Magnesium and zinc behave differently from the other divalent cations. While magnesium and zinc may charge-balance aluminum to some extent, they appear to have little or no role in stabilizing boron in four-fold coordination in the glasses described herein. Thus, replacing an alkali oxide with magnesium oxide in a boroaluminosilicate glass forces boron atoms out of four-fold coordination and into three-fold coordination, resulting in higher indentation crack initiation threshold load in ion-exchanged glass.

In addition to the oxides listed above, the glasses described herein may further comprise chemical fining agents including, but not limited to, halogens or halides (compounds containing F, Cl, Br and I) and at least one of the oxides $As_2O_3$, $Sb_2O_3$, $CeO_2$, and $SnO_2$. These fining agents, when present, are generally batched into the raw material at a level of about 0.5 mol % or less, and have minor impact on both the rate of ion exchange and the compressive stress that are ultimately obtained. In addition, other oxides may be added at low concentrations with little or no impact on the ion exchange characteristics of these glasses. Examples of such oxides include $ZrO_2$, which is a common contaminant introduced by zirconia refractories in melters; $TiO_2$, which is a common tramp component of natural silica sources; $Fe_2O_3$, which is an ubiquitous tramp oxide in all but the purest chemical reagents; and other transition metal oxides that may be used to introduce color. These transition metal oxides include $V_2O_5$, $Cr_2O_3$, $Co_3O_4$, $Fe_2O_3$, $MnO_2$, NiO, CuO, $Cu_2O$, and the like. Concentrations of these oxides, when present in the glass, are kept at levels of less than or equal to about 2 mol %. Compared to calcium, larger alkaline earths such as Sr and Ba lead to lower diffusivity and thus significantly lower depth of the compressive layer. Because Sr and Ba are costly reagents compared to most of the other oxides in the glasses described herein and inhibit or retard ion exchange. The concentrations of SrO and BaO, when present in the glass, are therefore kept at levels of no more than about 0.5 mol %. Rubidium and cesium oxides are too large to ion exchange at an appreciable rate, are costly, and contribute to high liquidus temperatures at elevated concentrations. The concentrations of these oxides are therefore kept below 0.5 mol %. Lithium oxide is to be generally avoided, as it contributes to "poisoning" of potassium nitrate salt ion exchange baths, resulting in lower compressive stress than if the same glass were ion exchanged in a lithium-free salt bath. In addition, compared to a sodium-for-potassium exchange, the presence of lithium leads to significantly reduced diffusivity when exchanging for potassium. When present in the glass, the lithium oxide concentration should therefore be kept below about 0.5 mol %, and, in some embodiments, below about 0.1 mol %. In some embodiments, the glasses described herein are substantially free of lithium. In some embodiments, the glasses described herein are substantially free of phosphorus.

As used herein, the term "zircon breakdown temperature" or "$T^{breakdown}$" refers to the temperature at which zircon—which is commonly used as a refractory material in glass processing and manufacture—breaks down to form zirconia and silica. In isoviscous processes such as fusion, the highest temperature experienced by the glass corresponds to a particular viscosity of the glass. For example, "$T^{35kP}$" refers to the temperature at which the glass has a viscosity of 35 kilopoise (kP). The difference between the breakdown temperature and the temperature corresponding to 35,000 poise viscosity is defined as the breakdown margin $T^{margin}$, where: $T^{margin}=T^{breakdown}-T^{35kp}$. When the breakdown margin $T^{margin}$ is negative, zircon will breakdown to form zirconia defects at some location on the fusion isopipe. When $T^{margin}$ is zero, it is still possible that temperature excursions could cause zircon breakdown to occur. It is therefore desirable not only to make the breakdown margin positive, but to maximize $T^{margin}$ as much as possible while being consistent with all the other attributes that must be maintained in the final glass product. In some embodiments, the glasses described herein have a zircon breakdown temperature that is equal to the temperature at which the viscosity of the glass is in a range from about 25 kPoise to about 40 kPoise, in some embodiments, in a range from about 30 kPoise to about 40 kPoise, and, in a particular embodiment, from 30 kPoise to about 35 kPoise. Zircon breakdown temperatures $T^{breakdown}$ measured for various samples of the glasses described herein are listed in Table 3.

As previously mentioned, zircon will breakdown to form zirconia and silica at some location on processing hardware—such as, for example, a fusion isopipe—when the breakdown margin $T^{margin}$ is negative. This often results in the inclusion of defects, bubbles, zirconia particles, or the like in the formed glass. The presence of such inclusions in the glass is typically detected by those means know in the art such as, for example, optical microscopy. The glasses described herein have positive zircon breakdown margins and, in some embodiments, have less than 0.1 inclusions per pound of glass, wherein the inclusions are at least about 50 μm in size (i.e., diameter, for approximately spherical particles, or major axis for elongated particles). In some embodiments, the glasses described herein contain less than 0.01 inclusions per pound of glass, wherein the inclusions are at least about 50 μm in size.

In those embodiments in which the glass is strengthened by ion exchange, the glass may, in some embodiments, be ion exchanged to create a surface layer that is under a compressive stress of at least about 600 megapascals (MPa) and, in other embodiments, at least about 800 MPa. The compressive surface layer has a depth of layer of at least about 30 microns (μm). The ion exchanged glasses described herein also possess a degree of native or intrinsic damage resistance (IDR), which may be characterized by a Vickers crack initiation threshold of greater than or equal to 10 kilogram force (kgf). In some embodiments, the ion exchanged glass has a Vickers crack initiation threshold in a range from about 20 kgf to about 30 kgf. In other embodiments, the ion exchanged glass has a Vickers crack initiation threshold in a range from about 30 kgf to about 35 kgf. The Vickers crack initiation threshold measurements described herein are performed by applying and then removing an indentation load to the glass surface at a rate of 0.2 mm/min. The maximum indentation load is held for 10 seconds. The crack initiation threshold is defined at the indentation load at which 50% of 10 indents exhibit any number of radial/median cracks emanating from the corners of the indent impression. The maximum load is increased until the threshold is met for a given glass composition. All indentation measurements are performed at room temperature in 50% relative humidity.

When ion exchanged, the glasses described herein have a compressive stress that is sufficiently high to provide outstanding damage resistance against impact of various kinds. The glasses described herein may be ion exchanged at a rate that facilitates large scale manufacturing. While it is advantageous to provide high compressive stress by annealing the glass prior to ion exchange, a high compressive stress may also be obtained by instead cooling the glass rapidly from a high temperature (e.g., above the strain point of the glass). Such rapid cooling may occur, for example, in down drawn processes such as fusion or slot draw processes. The combination of compressive stress, depth of layer, and intrinsic damage resistance of the ion exchanged glasses described herein provides excellent resistance to visible or strength-limiting damage introduced via sharp contact and scratching.

Physical properties of an exemplary sample of the glasses described herein, labeled Glass 3 and having the composition 67.45 mol % $SiO_2$, 12.69 mol % $Al_2O_3$, 3.67 mol % $B_2O_3$, 13.67 mol % $Na_2O$, 0.02 mol % $K_2O$, 2.36 mol % MgO, 0.03 mol % CaO, and 0.09 mol % $SnO_2$, are compared to those of glasses described in U.S. patent application Ser. No. 13/533,298, filed on Jul. 1, 2011, by Matthew J. Dejneka et al., entitled "Ion Exchangeable Glass With High Compressive Stress," which claims priority from U.S. Provisional Patent Application No. 61/503,734, filed on Jul. 1, 2011, by Matthew J. Dejneka et al., and having the same title; and U.S. Provisional Patent Application No. 61/653, 485, filed on May 31, 2012, by Matthew J. Dejneka et al., entitled "Ion Exchangeable Glass With High Damage Resistance;" labeled Glasses 1 and 2, respectively, in Table 1. Glass 1, having the composition 68.84 mol % $SiO_2$, 10.63 mol % $Al_2O_3$, 0 mol % $B_2O_3$, 14.86 mol % $Na_2O$, 0.02 mol % $K_2O$, 5.43 mol % MgO, 0.04 mol % CaO, and 0.17 mol % $SnO_2$, is compatible with zircon, but has a low indentation threshold, whereas Glass 2, having the composition 64.65 mol % $SiO_2$, 13.93 mol % $Al_2O_3$, 5.11 mol % $B_2O_3$, 13.75 mol % $Na_2O$, 0 mol % $K_2O$, 2.38 mol % MgO, 0.14 mol % CaO, and 0.08 mol % $SnO_2$, has a high indentation threshold but is incompatible with zircon. Glass 3 possesses a combination of high indentation threshold and compatibility with zircon, as described hereinabove.

TABLE 1

Physical properties of glasses.

| Glass | 1 | 2 | 3 |
|---|---|---|---|
| Anneal Point (° C.) | 650 | 629 | 644 |
| Strain Point (° C.) | 601 | 576 | 589 |
| Softening Point (° C.) | 891.7 | 900 | 922.4 |
| Density (g/cm³) | 2.432 | 2.39 | 2.403 |
| Poisson's Ratio | 0.205 | 0.216 | 0.213 |
| Shear Modulus (Mpsi) | 4.287 | 4.051 | 4.142 |
| Young's Modulus (Mpsi) | 10.336 | 9.851 | 10.046 |
| Liquidus Temperature (° C.) | 1020 | 1000 | 1005 |
| Liquidus Viscosity (kPoise) | 1000 | 1850 | 2210 |
| Primary Devit Phase | Forsterite | Nepheline | Forsterite |
| Zircon Breakdown Temperature (° C.) | 1200 | 1183 | 1230 |
| Zircon Breakdown Viscosity (kPoise) | 30.4 | 71.4 | 33.4 |
| 200 Poise Temperature (° C.) | 1665 | 1679 | 1757 |
| 35 kPoise Temperature (° C.): | 1190 | 1226 | 1227 |
| Refractive Index | 1.50030 | 1.49844 | 1.49836 |
| SOC (nm/MPa/cm) | 29.64 | 32.78 | 31.94 |
| Vickers Indentation Threshold (kgf) | 7 | >30 | 20-30 |

Additional non-limiting examples of the compositions of the glasses described herein and their properties are listed in Tables 2 and 3, respectively. The examples listed satisfy the requirement of having intrinsic damage resistance, as characterized by high indentation threshold, and compatibility with zircon, as characterized by low zircon breakdown viscosity.

TABLE 2

Examples of compositions of the glasses described herein.

| Analyzed (mol %) | Example | | | | | | |
|---|---|---|---|---|---|---|---|
| | 1 | 2 | 3 | 4 | 5 | 6 | 7 |
| $SiO_2$ | 67.26 | 67.47 | 67.37 | 67.43 | 67.22 | 67.12 | 67.29 |
| $Al_2O_3$ | 12.05 | 12.08 | 12.07 | 12.03 | 12.03 | 12.03 | 12.05 |
| $B_2O_3$ | 2.58 | 2.56 | 2.54 | 2.61 | 2.61 | 2.64 | 2.64 |
| $Na_2O$ | 14.14 | 13.08 | 14.10 | 13.10 | 14.20 | 13.33 | 13.20 |
| $K_2O$ | 0.01 | 0.96 | 0.01 | 0.96 | 0.03 | 0.94 | 0.96 |
| MgO | 3.80 | 3.69 | 3.34 | 3.27 | 3.34 | 3.36 | 2.82 |
| CaO | 0.05 | 0.04 | 0.48 | 0.49 | 0.06 | 0.05 | 0.48 |
| ZnO | 0.00 | 0.00 | 0.00 | 0.00 | 0.41 | 0.42 | 0.45 |
| $SnO_2$ | 0.09 | 0.09 | 0.09 | 0.09 | 0.09 | 0.09 | 0.09 |
| $ZrO_2$ | 0.01 | 0.01 | 0.01 | 0.01 | 0.01 | 0.01 | 0.01 |
| $Fe_2O_3$ | 0.01 | 0.01 | 0.01 | 0.01 | 0.01 | 0.01 | 0.01 |
| Total (mol %) | 100 | 100 | 100 | 100 | 100 | 100 | 100 |

| Analyzed (mol %) | Example | | | | | | |
|---|---|---|---|---|---|---|---|
| | 8 | 9 | 10 | 11 | 12 | 13 | 14 |
| $SiO_2$ | 67.25 | 66.32 | 66.32 | 66.22 | 66.26 | 67.28 | 67.29 |
| $Al_2O_3$ | 12.04 | 12.73 | 12.76 | 12.72 | 12.74 | 12.04 | 12.03 |
| $B_2O_3$ | 2.63 | 3.53 | 3.64 | 3.62 | 3.63 | 3.41 | 3.44 |
| $Na_2O$ | 13.30 | 13.93 | 12.89 | 13.07 | 13.06 | 13.87 | 12.93 |
| $K_2O$ | 0.96 | 0.03 | 0.95 | 0.96 | 0.97 | 0.01 | 0.94 |
| $Li_2O$ | | | | | | | |
| MgO | 2.76 | 3.31 | 2.84 | 2.85 | 2.32 | 2.79 | 2.77 |
| CaO | 0.05 | 0.05 | 0.48 | 0.05 | 0.47 | 0.49 | 0.49 |
| ZnO | 0.89 | 0.00 | 0.00 | 0.40 | 0.45 | 0.00 | 0.00 |
| $SnO_2$ | 0.09 | 0.09 | 0.09 | 0.09 | 0.09 | 0.09 | 0.09 |
| $ZrO_2$ | 0.01 | 0.01 | 0.02 | 0.01 | 0.01 | 0.01 | 0.01 |
| $Fe_2O_3$ | 0.01 | 0.01 | 0.01 | 0.01 | 0.01 | 0.01 | 0.01 |
| $P_2O_5$ | 0.00 | 0.00 | 0.00 | 0.00 | 0.00 | 0.00 | 0.00 |
| Total (mol %) | 100 | 100 | 100 | 100 | 100 | 100 | 100 |

| Analyzed (mol %) | Example | | | | | | |
|---|---|---|---|---|---|---|---|
| | 15 | 16 | 17 | 18 | 19 | 20 | 21 |
| $SiO_2$ | 67.18 | 66.27 | 66.33 | 66.16 | 67.23 | 67.61 | 66.82 |
| $Al_2O_3$ | 12.00 | 12.74 | 12.73 | 12.73 | 12.72 | 12.24 | 12.59 |
| $B_2O_3$ | 3.39 | 3.54 | 3.53 | 3.58 | 3.63 | 3.64 | 3.51 |
| $Na_2O$ | 14.10 | 14.11 | 14.12 | 14.19 | 13.91 | 13.96 | 14.47 |
| $K_2O$ | 0.04 | 0.01 | 0.01 | 0.01 | 0.01 | 0.04 | 0.01 |
| MgO | 1.82 | 2.27 | 1.79 | 1.84 | 2.34 | 2.35 | 2.45 |
| CaO | 0.49 | 0.05 | 0.04 | 0.48 | 0.05 | 0.06 | 0.05 |
| ZnO | 0.88 | 0.90 | 1.33 | 0.91 | 0.00 | 0.00 | 0.00 |
| $SnO_2$ | 0.09 | 0.09 | 0.09 | 0.09 | 0.09 | 0.09 | 0.09 |
| $ZrO_2$ | 0.01 | 0.01 | 0.01 | 0.01 | 0.01 | 0.01 | 0.01 |
| $Fe_2O_3$ | 0.01 | 0.01 | 0.01 | 0.01 | 0.01 | 0.01 | 0.01 |
| Total (mol %) | 100 | 100 | 100 | 100 | 100 | 100 | 100 |

| Analyzed (mol %) | Example | | | | | | |
|---|---|---|---|---|---|---|---|
| | 22 | 23 | 24 | 25 | 26 | 27 | 28 |
| $SiO_2$ | 66.59 | 67.05 | 66.38 | 66.98 | 67.05 | 67.09 | 67.23 |
| $Al_2O_3$ | 12.41 | 12.16 | 12.71 | 12.69 | 12.56 | 12.67 | 12.67 |
| $B_2O_3$ | 3.42 | 2.91 | 3.56 | 3.98 | 3.99 | 3.62 | 4.10 |
| $Na_2O$ | 13.40 | 13.34 | 14.19 | 13.91 | 13.55 | 14.16 | 13.97 |
| $K_2O$ | 0.66 | 0.85 | 0.01 | 0.01 | 0.01 | 0.01 | 0.03 |
| MgO | 3.01 | 2.88 | 1.79 | 2.21 | 2.05 | 2.24 | 1.83 |
| CaO | 0.12 | 0.06 | 0.04 | 0.03 | 0.03 | 0.03 | 0.06 |
| ZnO | 0.28 | 0.64 | 1.19 | 0.06 | 0.65 | 0.06 | 0.00 |
| $SnO_2$ | 0.09 | 0.09 | 0.09 | 0.09 | 0.09 | 0.09 | 0.09 |
| $ZrO_2$ | 0.01 | 0.01 | 0.03 | 0.01 | 0.01 | 0.01 | 0.01 |
| $Fe_2O_3$ | 0.01 | 0.01 | 0.01 | 0.01 | 0.01 | 0.01 | 0.01 |
| Total (mol %) | 100 | 100 | 100 | 100 | 100 | 100 | 100 |

TABLE 2-continued

Examples of compositions of the glasses described herein.

| Analyzed (mol %) | Example | | | | | | |
|---|---|---|---|---|---|---|---|
| | 29 | 30 | 31 | 32 | 33 | 34 | 35 |
| $SiO_2$ | 67.31 | 67.32 | 66.96 | 67.43 | 67.09 | 67.45 | 67.11 |
| $Al_2O_3$ | 12.54 | 12.65 | 12.63 | 12.56 | 12.66 | 12.46 | 12.57 |
| $B_2O_3$ | 4.25 | 3.76 | 3.96 | 3.93 | 4.15 | 4.07 | 4.12 |
| $Na_2O$ | 13.62 | 13.76 | 13.84 | 13.54 | 13.64 | 13.50 | 13.64 |
| $K_2O$ | 0.01 | 0.01 | 0.01 | 0.01 | 0.01 | 0.01 | 0.01 |
| MgO | 2.11 | 2.37 | 2.47 | 2.41 | 2.33 | 2.38 | 2.42 |
| CaO | 0.04 | 0.04 | 0.04 | 0.03 | 0.04 | 0.03 | 0.04 |
| ZnO | 0.00 | 0.00 | 0.00 | 0.00 | 0.00 | 0.00 | 0.00 |
| $SnO_2$ | 0.09 | 0.07 | 0.08 | 0.07 | 0.07 | 0.08 | 0.08 |
| $ZrO_2$ | 0.01 | 0.01 | 0.01 | 0.01 | 0.01 | 0.01 | 0.01 |
| $Fe_2O_3$ | 0.01 | 0.01 | 0.01 | 0.01 | 0.01 | 0.01 | 0.01 |
| Total (mol %) | 100 | 100 | 100 | 100 | 100 | 100 | 100 |

TABLE 3

Properties of glasses listed in Table 2.

| Example | 1 | 2 | 3 | 4 | 5 | 6 |
|---|---|---|---|---|---|---|
| Anneal Point (° C.): | 632 | 632 | 632 | 624 | 633 | 629 |
| Strain Point (° C.): | 579 | 580 | 581 | 573 | 581 | 577 |
| Softening Point (° C.): | 890.3 | 895.7 | 888.6 | 884 | 891.5 | 888.4 |
| Density (g/cm$^3$): | 2.418 | 2.417 | 2.421 | 2.422 | 2.424 | 2.425 |
| CTE (×10$^{-7}$/° C.): | 77.1 | 79.3 | 77.3 | 79.3 | 77.3 | 80.3 |
| Poisson's Ratio: | 0.216 | 0.202 | 0.211 | 0.21 | 0.202 | 0.214 |
| Shear Modulus (Mpsi): | 4.216 | 4.232 | 4.234 | 4.241 | 4.228 | 4.221 |
| Young's Modulus (Mpsi): | 10.25 | 10.174 | 10.252 | 10.265 | 10.16 | 10.247 |
| 72-hr Pt Liquidus Temp (° C.): | 1060 | 1070 | 1010 | 1000 | 1030 | 1040 |
| Liquidus Viscosity (kPoise): | 247 | 345 | 739 | 1458 | 810 | 810 |
| Primary Devit Phase: | Unknown | Unknown | Unknown | Unknown | Unknown | Unknown |
| 200-Poise Temp (° C.): | 1744.5 | 1715.2 | 1733.2 | 1724.3 | 1727.5 | 1736.6 |
| 35-kPoise Temp (° C.): | 1215.2 | 1210.8 | 1196.8 | 1199.6 | 1206.5 | 1213.5 |
| Fictivation Temp (° C.): | 721.8 | 715.8 | 714.3 | 704.5 | 717.2 | 717.1 |
| Refractive Index: | 1.50000 | 1.49992 | 1.50068 | 1.50104 | 1.50033 | 1.50051 |
| SOC (nm/MPa/cm): | 30.88 | 30.75 | 30.86 | 30.74 | 31.22 | 31.01 |
| CS at 50 μm DOL/410° C./1 mm/Annealed/Refined (MPa): | 989.6 | 954.8 | 979.6 | 938.6 | 968.8 | 941.4 |
| Time to 50 μm DOL at 410° C./Annealed/Refined (h): | 18.5 | 13.8 | 20.4 | 15 | 18.3 | 13.1 |
| Predicted Indentation Threshold at 410° C./8 h/Fictivated (kgf): | 15 | 16 | 14 | 14 | 16 | 15 |
| Zircon Breakdown Temperature (° C.): | 1210 | 1204 | 1207 | 1199 | 1206 | 1193 |
| Zircon Breakdown Viscosity (kPoise): | 38 | 39 | 30 | 35 | 36 | 48 |

| Example | 7 | 8 | 9 | 10 | 11 | 12 |
|---|---|---|---|---|---|---|
| Anneal Point (° C.): | 625 | 629 | 629 | 622 | 623 | 620 |
| Strain Point (° C.): | 573 | 576 | 577 | 570 | 571 | 568 |
| Softening Point (° C.): | 883.9 | 889.8 | 890.6 | 885.6 | 889.8 | 883.1 |
| Density (g/cm$^3$): | 2.428 | 2.422 | 2.411 | 2.414 | 2.418 | 2.421 |
| CTE (×10$^{-7}$/° C.): | 79.3 | 79.9 | 76.5 | 78.8 | 78.8 | 78.4 |
| Poisson's Ratio: | 0.221 | 0.209 | 0.213 | 0.209 | 0.212 | 0.215 |
| Shear Modulus (Mpsi): | 4.241 | 4.231 | 4.164 | 4.197 | 4.189 | 4.193 |
| Young's Modulus (Mpsi): | 10.36 | 10.228 | 10.106 | 10.148 | 10.153 | 10.192 |
| 72-hr Pt Liquidus Temp (° C.): | 970 | 995 | 1065 | 1025 | 1040 | 960 |
| Liquidus Viscosity (kPoise): | 2799 | 1401 | 287 | 939 | 805 | 4180 |

TABLE 3-continued

Properties of glasses listed in Table 2.

| | | | | | | |
|---|---|---|---|---|---|---|
| Primary Devit Phase: | Albite | Unknown | Unknown | Unknown | Unknown | Unknown |
| 200-Poise Temp (° C.): | 1721.0 | 1729.6 | 1716.9 | 1718.2 | 1722.0 | 1714.0 |
| 35-kPoise Temp (° C.): | 1205.1 | 1205.4 | 1212.1 | 1209.7 | 1213.1 | 1204.1 |
| Fictivation Temp (° C.): | 1.50124 | 1.50102 | 1.49967 | 1.50039 | 1.50016 | 1.50090 |
| Refractive Index: | 30.67 | 31.18 | 31.5 | 31.13 | 31.54 | 31.53 |
| SOC (nm/MPa/cm): | 957.4 | 945.5 | 968.3 | 942.5 | 927 | 927.6 |
| CS at 50 μm DOL/410° C./1 mm/Annealed/Refined (MPa): | 14.4 | 13.6 | 18.3 | 15.3 | 13.7 | 15.7 |
| Time to 50 μm DOL at 410° C./Annealed/Refined (h): | 11 | 15 | 20 | 18 | 18 | 17 |
| Zircon Breakdown Temperature (° C.): | 1192 | 1192 | 1202 | 1190 | 1187 | 1182 |
| Zircon Breakdown Viscosity (kPoise): | 43 | 43 | 41 | 48 | 52 | 49 |

| Example | 13 | 14 | 15 | 16 | 17 | 18 |
|---|---|---|---|---|---|---|
| Anneal Point (° C.): | 619 | 617 | 617 | 627 | 626 | 622 |
| Strain Point (° C.): | 568 | 567 | 567 | 574 | 573 | 571 |
| Softening Point (° C.): | 877.5 | 876.6 | 871.5 | 890.5 | 889.1 | 881.2 |
| Density (g/cm$^3$): | 2.415 | 2.415 | 2.429 | 2.425 | 2.432 | 2.43 |
| CTE ($\times 10^{-7}$/° C.): | 76.3 | 78.8 | 76.1 | 76.1 | 76.1 | 76.2 |
| Poisson's Ratio: | 0.223 | 0.203 | | 0.216 | 0.216 | 0.205 |
| Shear Modulus (Mpsi): | 4.221 | 4.226 | | 4.158 | 4.145 | 4.197 |
| Young's Modulus (Mpsi): | 10.324 | 10.171 | | 10.117 | 10.083 | 10.119 |
| 72-hr Pt Liquidus Temp (° C.): | 960 | 950 | 970 | 970 | 950 | 965 |
| Liquidus Viscosity (kPoise): | 2975 | 2742 | 3595 | 2933 | 3783 | 2470 |
| Primary Devit Phase: | Albite | Albite | Albite | Unknown | Albite | Albite |
| 200-Poise Temp (° C.): | 1692.6 | 1658.8 | 1815.2 | 1714.7 | 1725.1 | 1717.9 |
| 35-kPoise Temp (° C.): | 1179.0 | 1165.6 | 1226.2 | 1208.5 | 1207.9 | 1199.5 |
| Refractive Index: | 31.07 | 31.11 | 32.52 | 32.02 | 32.19 | 31.79 |
| SOC (nm/MPa/cm): | 933.5 | 908.4 | | 969.6 | 976.2 | 963.9 |
| CS at 50 μm DOL/410° C./1 mm/Annealed/Refined (MPa): | 21.8 | 16.4 | | 19.7 | 19.5 | 21.3 |
| Time to 50 μm DOL at 410° C./Annealed/Refined (h): | 13 | 16 | | 20 | 21 | 19 |
| Zircon Breakdown Temperature (° C.): | 1218 | 1208 | 1205 | 1193 | 1191 | 1184 |
| Zircon Breakdown Viscosity (kPoise): | 19 | 18 | 47 | 45 | 46 | 44 |

| Example | 19 | 20 | 21 | 22 | 23 | 24 |
|---|---|---|---|---|---|---|
| Anneal Point (° C.): | 629 | 621 | 621 | 629 | 629 | 626 |
| Strain Point (° C.): | 576 | 569 | 570 | 577 | 576 | 574 |
| Softening Point (° C.): | 898.9 | 884.3 | 877.3 | 893.2 | 896.2 | 890.2 |
| Density (g/cm$^3$): | 2.404 | 2.406 | 2.412 | 2.42 | 2.426 | 2.429 |
| CTE ($\times 10^{-7}$/° C.): | 76.4 | 76.8 | 78.1 | 78.2 | 78.6 | 76.1 |
| Poisson's Ratio: | 0.208 | 0.209 | 0.215 | 0.212 | 0.222 | 0.219 |
| Shear Modulus (Mpsi): | 4.141 | 4.161 | 4.152 | 4.222 | 4.222 | 4.158 |
| Young's Modulus (Mpsi): | 10 | 10.058 | 10.09 | 10.232 | 10.315 | 10.138 |
| 72-hr Pt Liquidus Temp (° C.): | 980 | 965 | 960 | 1030 | 1020 | 955 |
| Liquidus Viscosity (kPoise): | 980 | 950 | 960 | 1020 | 1020 | 945 |
| Primary Devit Phase: | 3592 | 3855 | 3649 | 904 | 1358 | 5875 |
| 200-Poise Temp (° C.): | Unknown | Albite | Albite | Unknown | Unknown | Albite |
| 35-kPoise Temp (° C.): | 1793.2 | 1760.7 | 1749.9 | 1715.3 | 1723.8 | 1705.4 |
| Fictivation Temp (° C.): | 1224.1 | 1209.5 | 1196.8 | 1206.8 | 1215.8 | 1205.7 |
| Refractive Index: | 1.49821 | 1.49833 | 1.49955 | 1.50044 | 1.50084 | 1.50117 |
| SOC (nm/MPa/cm): | 31.99 | 31.55 | 31.44 | 31.49 | 31.25 | 32 |
| CS at 50 μm DOL/410° C./1 mm/Annealed/Refined (MPa): | 944.9 | 920.7 | 944.7 | 1018.3 | | |
| Time to 50 μm DOL at 410° C./Annealed/Refined (h): | 15.4 | 16.3 | 17.6 | 16.3 | | |

TABLE 3-continued

Properties of glasses listed in Table 2.

| | | | | | | |
|---|---|---|---|---|---|---|
| Predicted Indentation Threshold at 410° C./8 h/Fictivated (kgf): | 23 | 21 | 21 | 15 | 13 | 20 |
| Zircon Breakdown Temperature (° C.): | 1216 | 1224 | 1199 | 1205 | 1195 | 1220 |
| Zircon Breakdown Viscosity (kPoise): | 39 | 28 | 34 | 36 | 49 | 28 |

| Example | 25 | 26 | 27 | 28 | 29 | 30 |
|---|---|---|---|---|---|---|
| Anneal Point (° C.): | 628 | 629 | 630 | 635 | 629 | 640 |
| Strain Point (° C.): | 576 | 576 | 577 | 582 | 576 | 586 |
| Softening Point (° C.): | 894.5 | 898 | 896.4 | 905.8 | 898.9 | 904.7 |
| Density (g/cm$^3$): | 2.405 | 2.412 | 2.409 | 2.405 | 2.402 | 2.402 |
| CTE ($\times 10^{-7}$/° C.): | 76.4 | 74.4 | 76.5 | 75.9 | 75 | 75.3 |
| Poisson's Ratio: | 0.225 | 0.219 | 0.206 | 0.207 | 0.223 | 0.214 |
| Shear Modulus (Mpsi): | 4.152 | 4.135 | 4.165 | 4.099 | 4.212 | 4.126 |
| Young's Modulus (Mpsi): | 10.173 | 10.079 | 10.048 | 9.893 | 10.299 | 10.02 |
| 72-hr Pt Liquidus Temp (° C.): | 980 | 990 | 965 | 960 | 970 | 1000 |
| Liquidus Viscosity (kPoise): | 970 | 970 | 950 | 945 | 950 | 995 |
| Primary Devit Phase: | 3223 Unknown | 2744 Unknown | 4960 Albite | 5696 Albite | 4346 Forsterite | 2738 Unknown |
| 200-Poise Temp (° C.): | | | | | | |
| 35-kPoise Temp (° C.): | 1725.2 | 1739.8 | 1729.2 | 1741.3 | 1744.1 | 1753.8 |
| Fictivation Temp (° C.): | 1213.2 | 1216.1 | 1215.4 | 1221.0 | 1221.4 | 1232.2 |
| Refractive Index: | 1.49840 | 1.49910 | 1.49860 | | | |
| SOC (nm/MPa/cm): | 32.52 | 32.61 | 31.88 | 31.73 | 32.06 | 32.13 |
| CS at 50 μm DOL/410° C./1 mm/Annealed/Refined (MPa): | 980.3 | 990.1 | 1006.9 | 1008.9 | 991.8 | 971.9 |
| Time to 50 μm DOL at 410° C./Annealed/Refined (h): | 17.1 | 19.3 | 16.7 | 17.5 | 18.0 | 15.8 |
| Predicted Indentation Threshold at 410° C./8 h/Fictivated (kgf): | 19 | 22 | 21 | 27 | 14 | 24 |
| Zircon Breakdown Temperature (° C.): | 1220 | 1250 | 1215 | 1218 | 1231 | 1223 |
| Zircon Breakdown Viscosity (kPoise): | 32 | 21 | 35 | 37 | 31 | 40 |

| Example | 31 | 32 | 33 | 34 | 35 |
|---|---|---|---|---|---|
| Anneal Point (° C.): | 630 | 632 | 623 | 634 | 628 |
| Strain Point (° C.): | 576 | 578 | 572 | 581 | 575 |
| Softening Point (° C.): | 903.8 | 909.1 | 888.9 | 909.4 | 912.8 |
| Density (g/cm$^3$): | 2.402 | 2.4 | 2.402 | 2.398 | 2.399 |
| CTE ($\times 10^{-7}$/° C.): | 74.8 | 75.2 | 76 | 74.6 | 74.2 |
| Poisson's Ratio: | 0.224 | 0.221 | 0.219 | 0.218 | 0.217 |
| Shear Modulus (Mpsi): | 4.121 | 4.118 | 4.105 | 4.11 | 4.118 |
| Young's Modulus (Mpsi): | 10.086 | 10.058 | 10.009 | 10.011 | 10.021 |
| 72-hr Pt Liquidus Temp (° C.): | 990 | 1005 | 1000 | 1010 | 1005 |
| Liquidus Viscosity (kPoise): | 980 | 1000 | 990 | 1000 | 1000 |
| Primary Devit Phase: | 2569 Unknown | 2319 Unknown | 1680 Unknown | 1825 Unknown | 1896 Unknown |
| 200-Poise Temp (° C.): | | | | | |
| 35-kPoise Temp (° C.): | 1769.7 | 1776.1 | 1756.4 | 1752.8 | 1754.2 |
| Fictivation Temp (° C.): | 1222.2 | 1231.5 | 1208.8 | 1226.4 | 1218.8 |
| Refractive Index: | | | | | |
| SOC (nm/MPa/cm): | 32.08 | 32.11 | 32.08 | 32 | 32.21 |
| CS at 50 μm DOL/410° C./1 mm/Annealed/Refined (MPa): | 970.3 | 962.8 | 947.1 | 940.8 | 953.0 |
| Time to 50 μm DOL at 410° C./Annealed/Refined (h): | 16.3 | 16.3 | 17.8 | 17.1 | 17.0 |
| Predicted Indentation Threshold at 410° C./8 h/Fictivated (kgf): | 22 | 23 | 25 | 24 | 24 |

TABLE 3-continued

Properties of glasses listed in Table 2.

| Zircon Breakdown Temperature (° C.): | 1219 | 1232 | 1226 | 1236 | 1227 |
|---|---|---|---|---|---|
| Zircon Breakdown Viscosity (kPoise): | 37 | 35 | 27 | 31 | 31 |

The glasses described herein are resistant to both chipping and scratching, making it well suited for use in cover plates, touch screens, watch crystals, solar concentrators, windows, screens, containers, and other applications that require strong and tough glass with good scratch resistance.

According to aspect (1), a glass is provided. The glass comprising: at least about 50 mol % $SiO_2$; at least about 10 mol % $R_2O$, wherein $R_2O$ comprises $Na_2O$; $Al_2O_3$, wherein $Al_2O_3$(mol %)<$R_2O$(mol %); and $B_2O_3$, wherein $B_2O_3$(mol %)−($R_2O$(mol %)−$Al_2O_3$(mol %))≥3 mol %, and wherein the glass is ion exchangeable.

According to aspect (2), the glass of aspect (1) is provided, wherein the glass is ion exchanged and has a layer under a compressive stress of at least about 600 MPa, the layer extending from a surface of the glass into the glass to a depth of layer of at least about 30 μm.

According to aspect (3), the glass of aspect (2) is provided, wherein the compressive stress is at least about 800 MPa.

According to aspect (4), the glass of aspect (2) is provided, wherein the glass has a Vickers crack initiation of at least about 10 kgf.

According to aspect (5), the glass of aspect (4) is provided, wherein the glass has a Vickers crack initiation threshold in a range from about 20 kgf to about 30 kgf.

According to aspect (6), the glass of aspect (4) is provided, wherein the glass has a Vickers crack initiation threshold in a range from about 30 kgf to about 35 kgf.

According to aspect (7), the glass of aspect (1) is provided, wherein the glass comprises from about 66 mol % to 74 mol % $SiO_2$.

According to aspect (8), the glass of aspect (1) is provided, wherein the glass comprises at least about 0.1 mol % of at least one of MgO and ZnO.

According to aspect (9), the glass of aspect (1) is provided, wherein the glass has a zircon breakdown temperature that is equal to a temperature at which the glass has a viscosity in a range from about 30 kPoise to about 40 kPoise.

According to aspect (10), the glass of aspect (1) is provided, wherein the glass comprises at least about 2.7 mol % $B_2O_3$ containing three-fold coordinated boron cations.

According to aspect (11), the glass of aspect (10) is provided, wherein the glass comprises from about 2.7 mol % to about 4.5 mol % $B_2O_3$ containing three-fold coordinated boron cations.

According to aspect (12), the glass of aspect (1) is provided, wherein at least 50% of the $B_2O_3$ present in the glass comprises three-fold coordinated boron cations.

According to aspect (13), the glass of aspect (1) is provided, wherein $B_2O_3$(mol %)−($R_2O$(mol %)−$Al_2O_3$(mol %))≥4.5 mol %.

According to aspect (14), the glass of aspect (1) is provided, wherein the glass comprises: at least about 50 mol % $SiO_2$, from about 9 mol % to about 22 mol % $Al_2O_3$; from about 3 mol % to about 10 mol % $B_2O_3$; from about 9 mol % to about 20 mol % $Na_2O$; from 0 mol % to about 5 mol % $K_2O$; at least about 0.1 mol % MgO, ZnO, or combinations thereof, wherein 0≤MgO≤6 and 0≤ZnO≤6 mol %; and, optionally, at least one of CaO, BaO, and SrO, wherein 0 mol %≤CaO+SrO+BaO≤2 mol %.

According to aspect (15), the glass of aspect (1) is provided, wherein the glass contains less than about 0.1 inclusion per pound of the glass, the inclusion having a size of at least about 50 μm.

According to aspect (16), the glass of aspect (1) is provided, wherein the glass is down-drawn.

According to aspect (17), the glass of aspect (1) is provided, wherein the glass has an anneal point and a strain point, and wherein the glass is fast-cooled from a temperature that is above the anneal point or the strain point.

According to aspect (18), a glass is provided. The glass comprising: at least about 50 mol % $SiO_2$; at least about 10 mol % $R_2O$, wherein $R_2O$ comprises $Na_2O$; $Al_2O_3$; and $B_2O_3$, wherein $B_2O_3$−($R_2O$−$Al_2O_3$)≥3 mol %, and wherein the glass has a zircon breakdown temperature that is equal to the temperature at which the glass has a viscosity in a range from about 25 kPoise to about 40 kPoise.

According to aspect (19), the glass of aspect (18) is provided, wherein the glass is ion exchanged and has a layer under a compressive stress of at least about 600 MPa, the layer extending from a surface of the glass into the glass to a depth of layer of at least about 30 μm.

According to aspect (20), the glass of aspect (19) is provided, wherein the compressive stress is at least about 800 MPa.

According to aspect (21), the glass of aspect (19) is provided, wherein the glass has a Vickers crack initiation threshold of at least about 10 kgf.

According to aspect (22), the glass of aspect (21) is provided, wherein the glass has a Vickers crack initiation threshold in a range from about 20 kgf to about 30 kgf.

According to aspect (23), the glass of aspect (21) is provided, wherein the glass has a Vickers crack initiation threshold in a range from about 30 kgf to about 35 kgf.

According to aspect (24), the glass of aspect (18) is provided, wherein the glass comprises from about 66 mol % to about 74 mol % $SiO_2$.

According to aspect (25), the glass of aspect (18) is provided, wherein the glass comprises at least about 0.1 mol % of at least one of MgO and ZnO.

According to aspect (26), the glass of aspect (18) is provided, wherein the glass comprises at least about 2.7 mol % $B_2O_3$ containing three-fold coordinated boron cations.

According to aspect (27), the glass of aspect (26) is provided, wherein the glass comprises from about 2.7 mol % to about 4.5 mol % $B_2O_3$ in which the $B_2O_3$ contains three-fold coordinated boron cations.

According to aspect (28), the glass of aspect (18) is provided, wherein at least 50% of the $B_2O_3$ present in the glass comprises three-fold coordinated boron cations.

According to aspect (29), the glass of aspect (18) is provided, wherein $B_2O_3$(mol %)− ($R_2O$(mol %)— $Al_2O_3$(mol %))≥4.5 mol %.

According to aspect (30), the glass of aspect (18) is provided, wherein the glass comprises: at least about 50 mol % $SiO_2$, from about 9 mol % to about 22 mol % $Al_2O_3$; from about 3 mol % to about 10 mol % $B_2O_3$; from about 9 mol % to about 20 mol % $Na_2O$; from 0 mol % to about 5 mol % $K_2O$; at least about 0.1 mol % MgO, ZnO, or combinations thereof, wherein 0≤MgO≤6 and 0≤ZnO≤6; and, optionally, at least one of CaO, BaO, and SrO, wherein 0 mol %≤CaO+SrO+BaO≤2 mol %.

According to aspect (31), the glass of aspect (18) is provided, wherein the silicate glass forms at least a portion of a cover plate, a touch screen, a watch crystal, a solar concentrator, a window, a screen, or a container.

According to aspect (32), the glass of aspect (18) is provided, wherein the glass contains less than about 0.1 inclusion per pound of the glass, the inclusion having a size of at least about 50 μm.

According to aspect (33), the glass of aspect (18) is provided, wherein the glass is down-drawn.

According to aspect (34), the glass of aspect (18) is provided, wherein the glass has an anneal point and a strain point, and wherein the glass is fast-cooled from a temperature that is above the anneal point or the strain point.

According to aspect (35), a glass is provided. The glass is ion exchanged and has a Vickers crack initiation threshold of at least about 10 kgf, the glass comprising: at least about 50 mol % $SiO_2$; at least about 10 mol % $R_2O$, wherein $R_2O$ comprises $Na_2O$; $Al_2O_3$, wherein $Al_2O_3$(mol %)<$R_2O$(mol %); and $B_2O_3$, wherein $B_2O_3$(mol %)−($R_2O$(mol %)−$Al_2O_3$ (mol %))≥3 mol %.

According to aspect (36), the glass of aspect (35) is provided, wherein the glass has a layer under a compressive stress of at least about 600 MPa, the layer extending from a surface of the glass into the glass to a depth of layer of at least about 30 μm.

According to aspect (37), the glass of aspect (36) is provided, wherein the compressive stress is at least about 800 MPa.

According to aspect (38), the glass of aspect (35) is provided, wherein the glass has a Vickers crack initiation threshold in a range from about 20 kgf to about 30 kgf.

According to aspect (39), the glass of aspect (35) is provided, wherein the glass has a Vickers crack initiation threshold in a range from about 30 kgf to about 35 kgf.

According to aspect (40), the glass of aspect (35) is provided, wherein the glass comprises from about 66 to about 74 mol % $SiO_2$.

According to aspect (41), the glass of aspect (35) is provided, wherein the glass comprises at least about 0.1 mol % of at least one of MgO and ZnO.

According to aspect (42), the glass of aspect (35) is provided, wherein the glass comprises from about 2.7 mol % to about 4.5 mol % $B_2O_3$ in which the $B_2O_3$ contains three-fold coordinated boron cations.

According to aspect (43), the glass of aspect (35) is provided, wherein $B_2O_3$(mol %)−($R_2O$(mol %)−$Al_2O_3$(mol %))≥4.5 mol %.

According to aspect (44), the glass of aspect (35) is provided, wherein at least 50% of the $B_2O_3$ present in the glass comprises three-fold coordinated boron cations.

According to aspect (45), the glass of aspect (35) is provided, wherein the glass comprises: at least about 50 mol % $SiO_2$, from about 9 mol % to about 22 mol % $Al_2O_3$; from about 3 mol % to about 10 mol % $B_2O_3$; from about 9 mol % to about 20 mol % $Na_2O$; from 0 mol % to about 5 mol % $K_2O$; at least about 0.1 mol % MgO, ZnO, or combinations thereof, wherein 0≤MgO≤6 and 0≤ZnO≤6; and, optionally, at least one of CaO, BaO, and SrO, wherein 0 mol %≤CaO+SrO+BaO≤2 mol %.

According to aspect (46), the glass of aspect (35) is provided, wherein the glass contains less than about 0.1 inclusion per pound of the glass, the inclusion having a size of at least about 50 μm.

According to aspect (47), the glass of aspect (35) is provided, wherein the glass is down-drawn.

According to aspect (48), the glass of aspect (35) is provided, wherein the glass has an anneal point and a strain point, and wherein the glass is fast-cooled from a temperature that is above the anneal point or the strain point.

According to aspect (49), the glass of aspect (35) is provided, wherein the silicate glass forms at least a portion of a cover plate, a touch screen, a watch crystal, a solar concentrator, a window, a screen, or a container.

According to aspect (50), a glass is provided. The glass comprising: at least about 50 mol % $SiO_2$; at least about 10 mol % $R_2O$, wherein $R_2O$ comprises $Na_2O$; $Al_2O_3$; and at least 2.7 mol % $B_2O_3$ containing coordinated boron cations, wherein $B_2O_3$−($R_2O$−$Al_2O_3$)≥3 mol %.

According to aspect (51), the glass of aspect (50) is provided, wherein the glass is ion exchanged and has a layer under a compressive stress of at least about 600 MPa, the layer extending from a surface of the glass into the glass to a depth of layer of at least about 30 μm.

According to aspect (52), the glass of aspect (51) is provided, wherein the compressive stress is at least about 800 MPa.

According to aspect (53), the glass of aspect (51) is provided, wherein the glass has a Vickers crack initiation of at least about 10 kgf.

According to aspect (54), the glass of aspect (53) is provided, the glass of aspect (50) is provided, wherein the glass has a Vickers crack initiation threshold in a range from about 20 kgf to about 30 kgf.

According to aspect (55), the glass of aspect (53) is provided, wherein the glass has a Vickers crack initiation threshold in a range from about 30 kgf to about 35 kgf.

According to aspect (56), the glass of aspect (50) is provided, wherein the glass comprises from about 66 mol % to 74 mol % $SiO_2$.

According to aspect (57), the glass of aspect (50) is provided, wherein the glass comprises at least about 0.1 mol % of at least one of MgO and ZnO.

According to aspect (58), the glass of aspect (50) is provided, wherein the glass has a zircon breakdown temperature that is equal to a temperature at which the glass has a viscosity in a range from about 30 kPoise to about 40 kPoise.

According to aspect (59), the glass of aspect (50) is provided, wherein the glass comprises from about 2.7 mol % to about 4.5 mol % $B_2O_3$ containing three-fold coordinated boron cations.

According to aspect (60), the glass of aspect (50) is provided, wherein at least 50% of the $B_2O_3$ present in the glass comprises three-fold coordinated boron cations.

According to aspect (61), the glass of aspect (50) is provided, wherein $B_2O_3$(mol %)−($R_2O$(mol %)−$Al_2O_3$(mol %))≥4.5 mol %.

According to aspect (62), the glass of aspect (50) is provided, wherein the glass comprises: at least about 50 mol % $SiO_2$, from about 9 mol % to about 22 mol % $Al_2O_3$; from about 3 mol % to about 10 mol % $B_2O_3$; from about 9 mol % to about 20 mol % $Na_2O$; from 0 mol % to about 5 mol % $K_2O$; at least about 0.1 mol % MgO, ZnO, or combinations thereof, wherein 0≤MgO≤6 and 0≤ZnO≤6 mol %; and, optionally, at least one of CaO, BaO, and SrO, wherein 0 mol %≤CaO+SrO+BaO≤2 mol %.

According to aspect (63), the glass of aspect (50) is provided, wherein the glass contains less than about 0.1 inclusion per pound of the glass, the inclusion having a size of at least about 50 μm.

According to aspect (64), the glass of aspect (50) is provided, wherein the glass is down-drawn.

According to aspect (65), the glass of aspect (50) is provided, wherein the glass has an anneal point and a strain point, and wherein the glass is fast-cooled from a temperature that is above the anneal point or the strain point.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

What is claimed is:

1. A glass comprising:
   at least 50 mol % $SiO_2$;
   9 mol % to 22 mol % $Al_2O_3$;
   9 mol % to 20 mol % $Na_2O$;
   at least 10 mol % $R_2O$, wherein:
     $R_2O$ is the sum (mol %) of alkali metal oxides in the glass; and
     $Al_2O_3$ is less than $R_2O$;
   $B_2O_3$, wherein the $B_2O_3$ is less than or equal to 4.5 mol % and $(B_2O_3-(R_2O-Al_2O_3))$ is less than or equal to 4.5 mol %;
   at least 0.1 mol. % MgO;
   at least 0.1 mol. % ZnO, wherein MgO+ZnO is less than or equal to 6 mol %; and
   at least one of CaO, BaO, and SrO, wherein (CaO+BaO+SrO) is greater than 0 mol % and less than or equal to 2 mol %.

2. The glass of claim 1, further comprising $K_2O$.

3. The glass of claim 1, further comprising from 0 mol % to 5 mol % $K_2O$.

4. The glass of claim 1, further comprising $Li_2O$.

5. The glass of claim 1, wherein the glass has a zirconia breakdown temperature that is equal to the temperature at which the glass has a viscosity in a range from 30 kPoise to 40 kPoise.

6. An ion exchanged glass article comprising:
   at least 50 mol % $SiO_2$;
   9 mol % to 22 mol % $Al_2O_3$;
   9 mol % to 20 mol % $Na_2O$;
   at least 10 mol % $R_2O$, wherein:
     $R_2O$ is the sum (mol %) of alkali metal oxides in the glass article; and
     $Al_2O_3$ is less than $R_2O$;
   $B_2O_3$, wherein the $B_2O_3$ is less than or equal to 4.5 mol % and $(B_2O_3-(R_2O-Al_2O_3))$ is less than or equal to 4.5 mol %;
   at least 0.1 mol. % MgO;
   at least 0.1 mol. % ZnO, wherein MgO+ZnO is less than or equal to 6 mol %;
   at least one of CaO, BaO, and SrO, wherein (CaO+BaO+SrO) is greater than 0 mol % and less than or equal to 2 mol %; and
   a layer under a compressive stress of at least 600 MPa.

7. The ion exchanged glass article of claim 6, further comprising $K_2O$.

8. The ion exchanged glass article of claim 6, further comprising from 0 mol % to 5 mol % $K_2O$.

9. The ion exchanged glass article of claim 6, further comprising $Li_2O$.

10. The ion exchanged glass article of claim 6, wherein the glass has a zirconia breakdown temperature that is equal to the temperature at which the glass has a viscosity in a range from 30 kPoise to 40 kPoise.

11. The ion exchanged glass article of claim 6, wherein the layer under the compressive stress extends from a surface of the glass into the glass to a depth of layer of at least 30 μm.

12. The ion exchanged glass article of claim 11, wherein the compressive stress is at least 800 MPa.

* * * * *